United States Patent
Mishra et al.

(10) Patent No.: US 11,334,134 B2
(45) Date of Patent: May 17, 2022

(54) INTEGRATED CIRCUIT

(71) Applicant: QUALCOMM Incorporated, San Diego, CA (US)

(72) Inventors: Lalan Jee Mishra, San Diego, CA (US); Naveen Kumar Narala, Bengaluru (IN); Richard Dominic Wietfeldt, San Diego, CA (US); Christopher Kong Yee Chun, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/037,984

(22) Filed: Sep. 30, 2020

(65) Prior Publication Data

US 2022/0100248 A1 Mar. 31, 2022

(51) Int. Cl.
*G06F 1/28* (2006.01)
*G06F 13/36* (2006.01)

(52) U.S. Cl.
CPC ............... *G06F 1/28* (2013.01); *G06F 13/36* (2013.01)

(58) Field of Classification Search
CPC .......... G06F 1/28; G06F 13/36; G06F 13/102; G06F 13/20; G06F 13/10
See application file for complete search history.

(56) References Cited

U.S. PATENT DOCUMENTS

| | | | | |
|---|---|---|---|---|
| 8,429,320 | B2* | 4/2013 | du Preez | G06F 13/4286 710/106 |
| 10,642,778 | B2 | 5/2020 | Mishra et al. | |
| 2017/0116141 | A1* | 4/2017 | Mishra | G06F 13/102 |
| 2018/0329856 | A1* | 11/2018 | Mishra | G06F 13/20 |
| 2020/0034158 | A1* | 1/2020 | Wietfeldt | G06F 1/10 |

OTHER PUBLICATIONS

International Search Report and Written Opinion for International Patent Application No. PCT/US2021/044458, mailed Jan. 3, 2022, 13 pages.
Mipi Alliance, "MIPI SPMI System Power Management Interface," Dec. 31, 2012, pp. 1-5, XP055830204, Retrieved from the Internet: URL: https://www.mipi.org/sites/default/files/MIPL_SPM_Interface_Overview_r01.pdf [retrieved on Aug. 4, 2021], 5 pages.

* cited by examiner

*Primary Examiner* — Raymond N Phan
(74) *Attorney, Agent, or Firm* — QUALCOMM Incorporated

(57) ABSTRACT

Expanded function datagrams in a system power management interface (SPMI) system allow a slave to use an expanded function datagram to address a larger number of masters (e.g., more than four) associated with the SPMI system. Furthermore, addressing may allow for a datagram to be broadcast to multiple masters concurrently. Still further, by signaling that the master addressing is other than the standard SPMI format, the nature of the address and payload of a datagram may be varied to handle larger volumes of data than the SPMI standard normally allows.

21 Claims, 11 Drawing Sheets

INTEGRATED CIRCUIT

BACKGROUND

I. Field of the Disclosure

The technology of the disclosure relates generally to controlling a power management interface bus and, more particularly, to controlling a system power management interface (SPMI) bus.

II. Background

Computing devices abound in modern society. The proliferation of computing devices is at least in part attributable to the rise of mobile computing devices such as smart phones. Computing devices frequently rely on different specialized integrated circuits (ICs) that perform specific functions for the computing devices. When more than one IC is present, there must be an accepted protocol or standard through which the ICs may communicate with one another. Much as the ICs may be specialized in the tasks that they are capable of performing so too have specialized protocols been created. One such protocol is the system power management interface (SPMI) put forth by the MIPI Alliance.

SUMMARY OF THE DISCLOSURE

Aspects disclosed in the detailed description include expanded function datagrams in a system power management interface (SPMI) system. In particular, a slave may use an expanded function datagram to address a larger number of masters (e.g., more than four) associated with the SPMI system. Furthermore, addressing may allow for a datagram to be broadcast to multiple masters concurrently. Still further, by signaling that the master addressing is other than the standard SPMI format, the nature of the address and payload of a datagram may be varied to handle larger volumes of data than the SPMI standard normally allows. Such expanded datagram functionality may reduce latency and improve overall performance within the SPMI system.

In this regard in one aspect, an integrated circuit (IC) is disclosed. The IC includes a bus interface coupled to a two-wire power management bus. The IC also includes a control circuit coupled to the bus interface. The control circuit is configured to form a datagram including a command frame. The command frame includes a first two bits indicating one of a first group of masters function, a second group of masters function, or a broadcast function. The command frame also includes a second two bits indicating a first address of a first master within a first group of masters or a second address of a second master within a second group of masters. The command frame also includes a command structure.

In another aspect, an IC is disclosed. The IC includes a bus interface coupled to a two-wire power management bus. The IC also includes a control circuit coupled to the bus interface. The control circuit is configured to receive a datagram through the bus interface. The datagram includes a first two bits indicating one of a first group of masters function, a second group of masters function, or a broadcast function. The datagram also includes a second two bits indicating a first address of a first master within a first group of masters or a second address of a second master within a second group of masters. The datagram also includes a command structure.

In another aspect, a power management subsystem is disclosed. The power management subsystem includes a two-wire power management bus. The power management subsystem also includes a first IC. The first IC includes a slave bus interface coupled to the two-wire power management bus. The first IC also includes a slave control circuit coupled to the slave bus interface. The slave control circuit is configured to form a datagram including a command frame. The command frame includes a first two bits indicating one of a first group of masters function, a second group of masters function, or a broadcast function. The command frame also includes a second two bits indicating a first address of a first master within a first group of masters or a second address of a second master within a second group of masters. The command frame also includes a command structure. The power management subsystem also includes a second IC. The second IC includes a master bus interface coupled to the two-wire power management bus. The second IC also includes a master control circuit coupled to the master bus interface. The master control circuit is configured to receive the datagram through the master bus interface.

DETAILED DESCRIPTION

Figure 1:
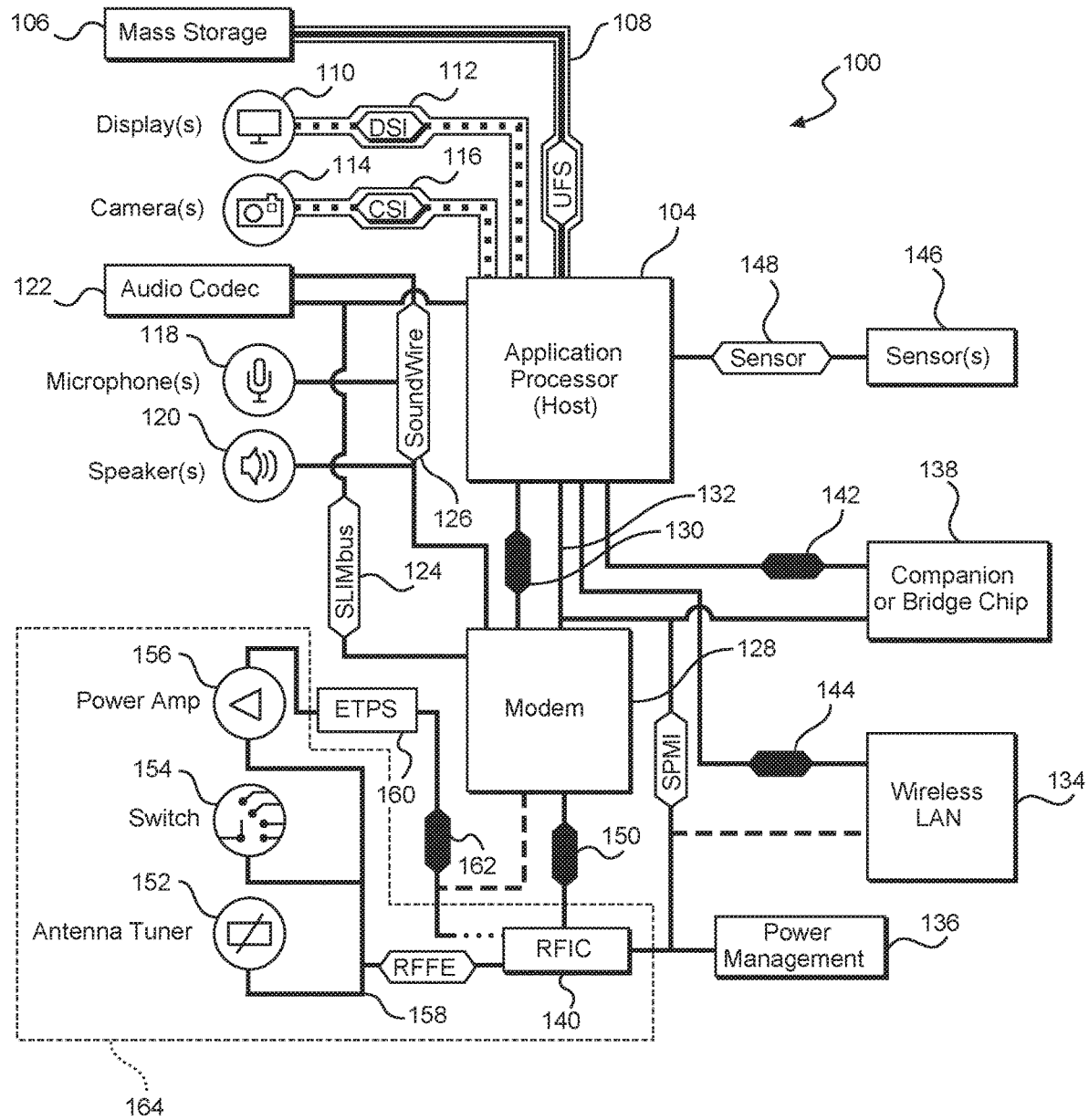
FIG. 1 is a block diagram of an exemplary computing device with associated buses therein including a system power management interface (SPMI) bus.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include expanded function datagrams in a system power management interface (SPMI) system. In particular, a slave may use an expanded function datagram to address a larger number of masters (e.g., more than four) associated with the SPMI system. Furthermore, addressing may allow for a datagram to be broadcast to multiple masters concurrently. Still further, by signaling that the master addressing is other than the standard SPMI format, the nature of the address and payload of a datagram may be varied to handle larger volumes of data than the SPMI standard normally allows. Such expanded datagram functionality may reduce latency and improve overall performance within the SPMI system.

Before addressing particulars of how the datagram is modified to allow the expanded functionality, an overview of a mobile terminal having an SPMI system as well as details about a master and slave within such an SPMI system are provided with reference to FIGS. 1-4. A conventional datagram of the SPMI system is provided in FIG. 5 to provide context to the expanded functions provided by the present disclosure, the discussion of which begins below with reference to FIG. 6.

FIG. 1 is a system-level block diagram of an exemplary mobile terminal 100 such as a smart phone, mobile computing device tablet, or the like that may include an SPMI system (sometimes also referred to as a subsystem since it is within the larger system of the mobile terminal) which may use the expanded function datagrams of the present disclosure. With continued reference to FIG. 1, the mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUNDWIRE bus 126. The modem 128 may further be connected to the application processor 104 through a peripheral component interconnect (PCI) or PCI express (PCIE) bus 130 and/or an SPMI bus 132. The SPMI bus 132 may be a two-wire bus including a clock line and a data line (not illustrated in FIG. 1). At its simplest, SPMI is a protocol to communicate between a host and a power management integrated circuit (e.g., PMIC 136 described below) to control voltage regulators from the host and communicate voltage increases and decreases back from the PMIC 136.

With continued reference to FIG. 1, the SPMI bus 132 may also be coupled to a local area network (LAN or WLAN) IC (LAN IC or WLAN IC) 134, a power management integrated circuit (PMIC) 136, a companion IC (sometimes referred to as a bridge chip) 138, and a radio frequency IC (RFIC) 140. In exemplary aspects, one or more of these ICs may be masters or slaves. More detail on masters and slaves within an SPMI system are provided below with reference to FIG. 2. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through a radio frequency front end (RFFE) bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated).

Figure 2:
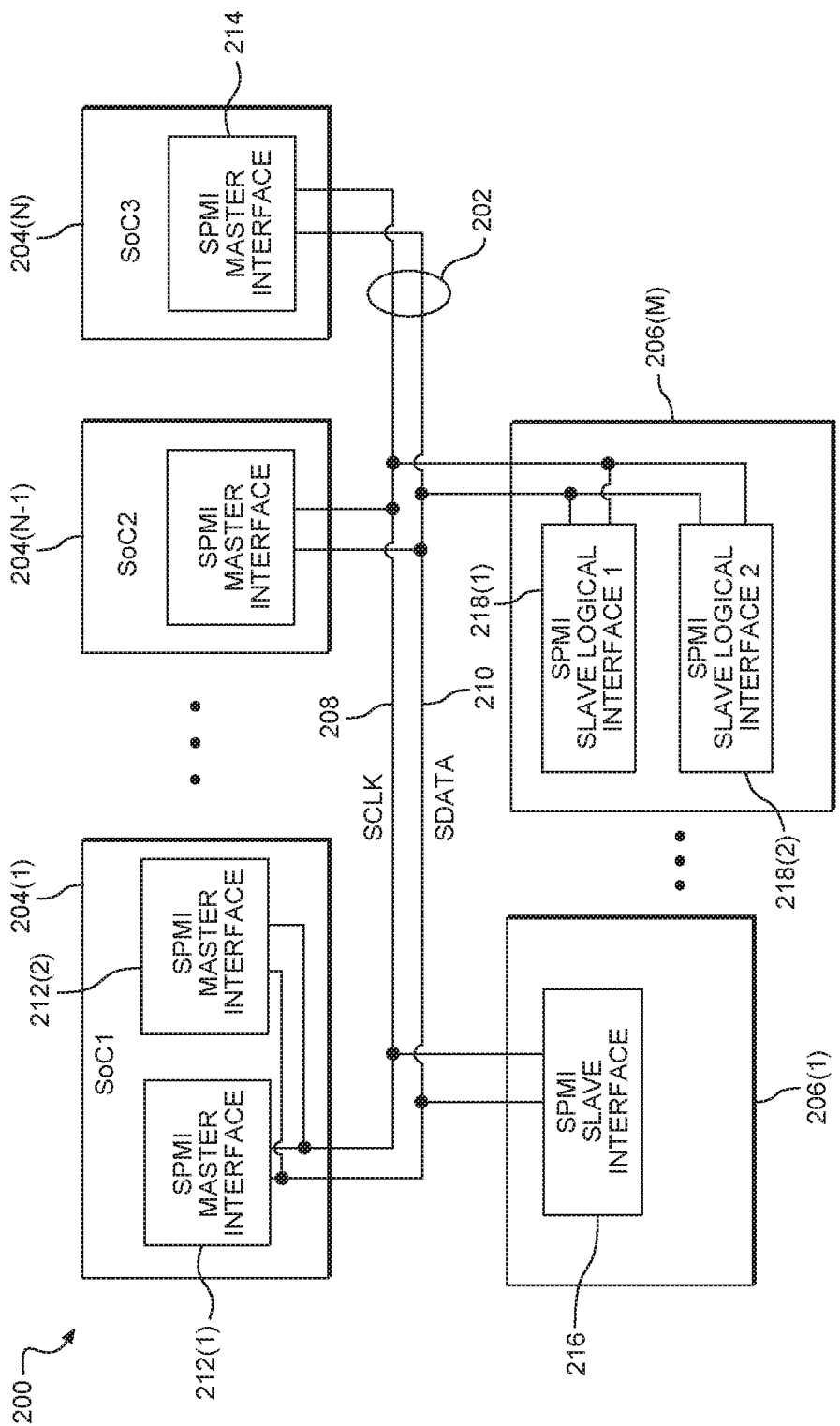
FIG. 2 is a block diagram of an SPMI subsystem having multiple masters and multiple slaves attached to an SPMI bus.

FIG. 2 is a block diagram of an SPMI subsystem 200 (also generically referred to as a power management system) having multiple masters and multiple slaves attached to a two-wire SPMI bus 202 (sometimes just referred to as a two-wire bus or a two-wire power management interface bus), which may be the SPMI bus 132 of FIG. 1. In this regard, the SPMI subsystem 200 includes a plurality of masters 204(1)-204(N) and a plurality of slaves 206(1)-206(M). As illustrated, N=3 and M=2, but it should be appreciated that the conventional SPMI standard allows up to four masters 204 and up to sixteen slaves 206. Exemplary aspects of the present disclosure allow for up to eight masters 204, which may be useful in multi-core processors that are increasingly being used in mobile terminals such as mobile terminal 100. The SPMI bus 202 may include a clock line 208 and a data line 210 (also referred as SCLK and SDATA, respectively, in FIG. 2). A given master 204(1) may have multiple (in this case two) SPMI interfaces 212(1)-212(2) coupled to the SPMI bus 202. More commonly, a master such as master 204(N) may have a single SPMI interface 214 coupled to the SPMI bus 202. Similarly, a slave such as slave 206(1) may have a single SPMI interface 216 and a slave such as slave 206(M) may have multiple (in this case two) SPMI interfaces 218(1)-218(2).

Figure 3:
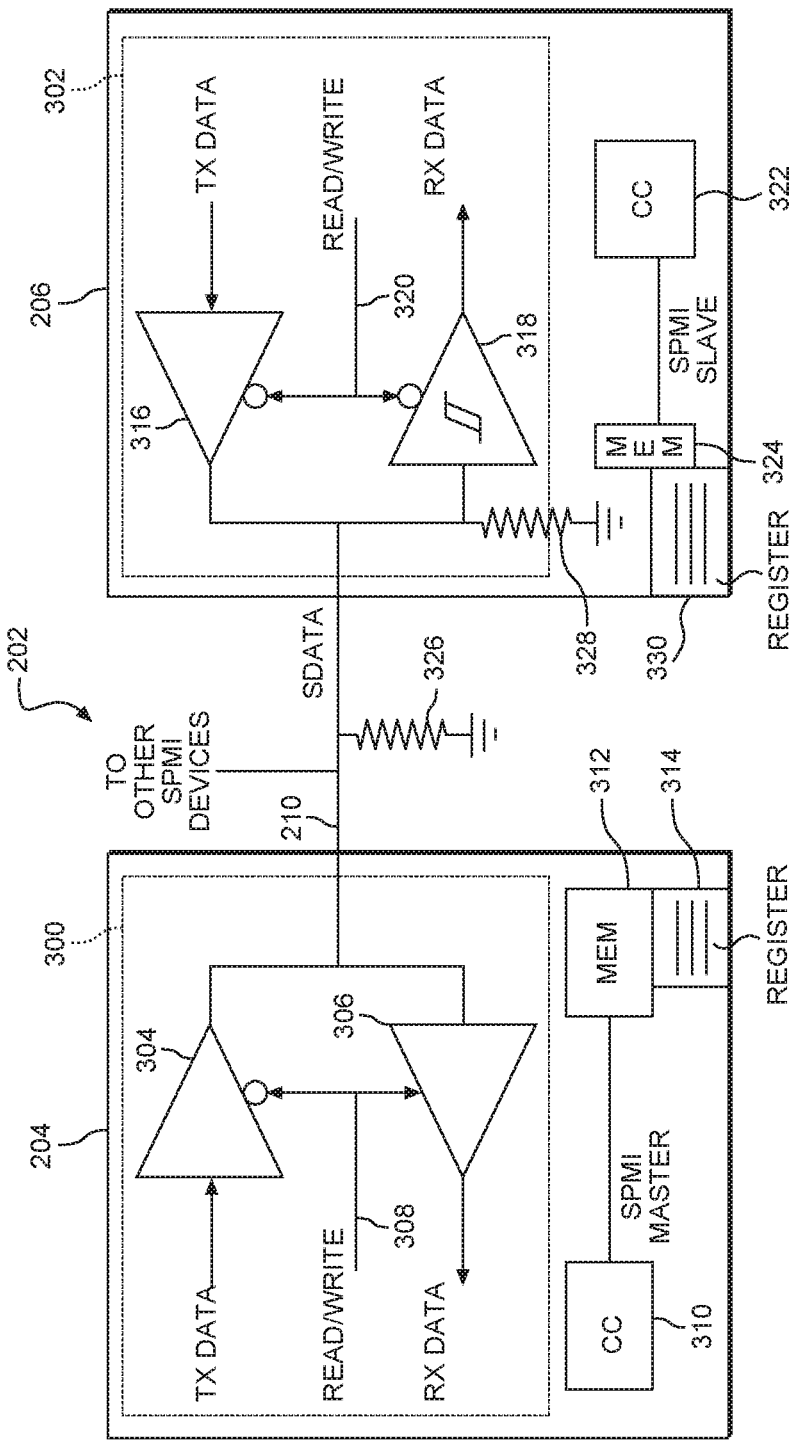
FIG. 3 is a schematic diagram of input/output requirements for a data line of an SPMI bus for a master and a slave.

FIG. 3 is a schematic diagram of input/output requirements for the data line 210 of the SPMI bus 202 for a master 204 and a slave 206. In particular, a bus interface 300 for the master 204 is illustrated along with a bus interface 302 for the slave 206. The bus interface 300 includes a data out amplifier 304 that sends data on the data line 210 and a data in amplifier 306 that amplifies incoming signals received on the data line 210. The data out/in amplifiers 304, 306 are toggled by a read/write or data in enable signal 308. The master 204 may further include a control circuit 310 (sometimes referred to as CC in the drawings) and a memory element 312 (sometimes referred to as MEM in the drawings) in which registers 314 are stored. The registers 314 may be read from by the slave 206 or written to by the slave 206 using the expanded function datagrams of the present disclosure.

The bus interface 302 includes a data out amplifier 316 that sends data on the data line 210 and a data in amplifier 318 that amplifies incoming signals received on the data line 210. The data out/in amplifiers 316, 318 are toggled by a read/write or data in enable signal 320. The slave 206 may further include a control circuit 322 (sometimes referred to as CC in the drawings) and a memory element 324 (sometimes referred to as MEM in the drawings). Additional pull-down resistors 326 and 328 may be associated with the data line 210 to help provide a logical low when desired. Note that both, one, or neither of the pull-down resistors 326, 328 may be present. The slave 206 may further include registers 330 which the master 204 may write to or read from according to the conventional SPMI protocol.

Figure 4:
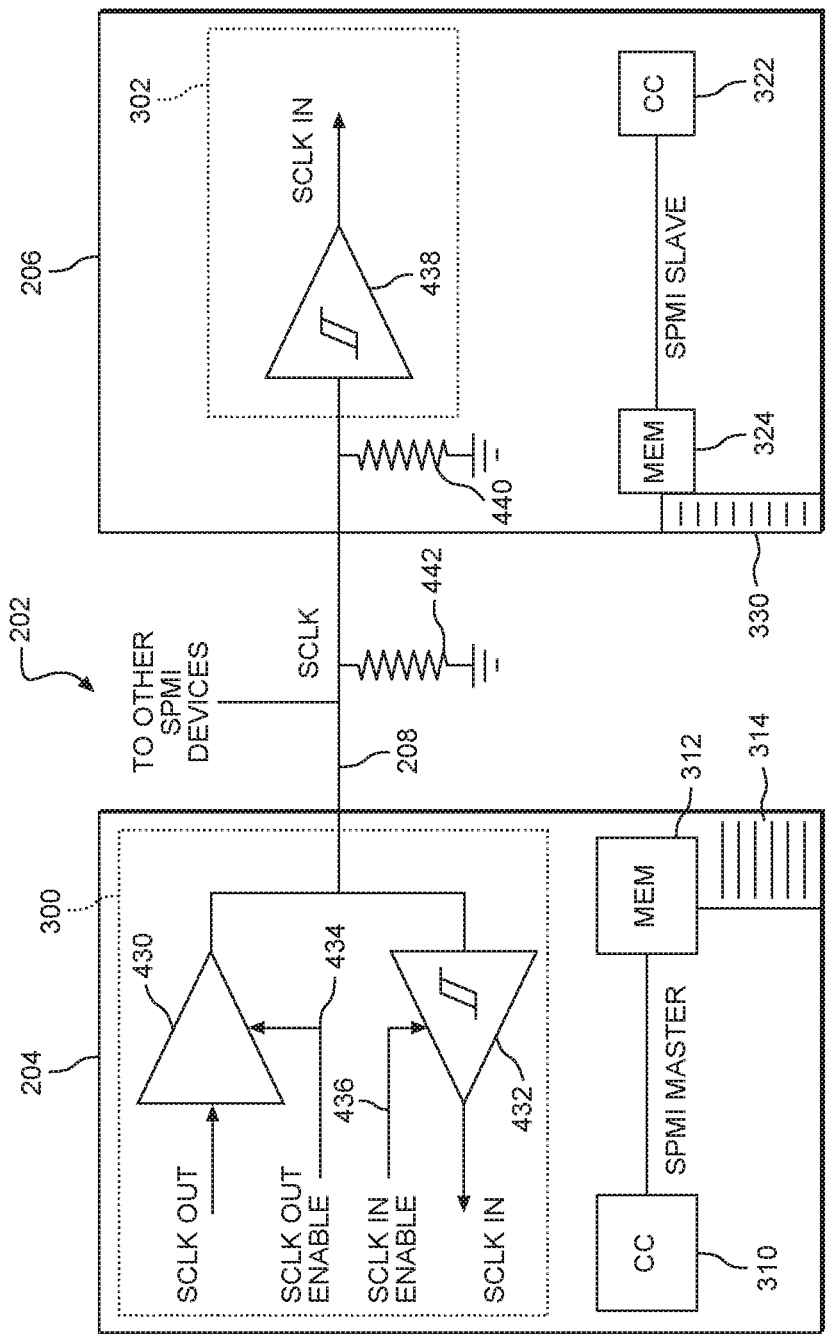
FIG. 4 is a schematic diagram of input/output requirements for a clock line of an SPMI bus for a master and a slave.

FIG. 4 is a schematic diagram of input/output requirements for the clock line 208 of the SPMI bus 202 for the master 204 and the slave 206. In particular, the bus interface 300 for the master 204 is illustrated along with the bus interface 302 for the slave 206. The bus interface 300 includes a clock out amplifier 430 that sends a clock signal from a clock source (not shown) on the clock line 208 and a clock in amplifier 432 that amplifies incoming signals received on the clock line 208 (including any reflections). The clock out amplifier 430 is enabled by an SCLK OUT ENABLE signal 434, while the clock in amplifier 432 is enabled by an SCLK IN ENABLE signal 436.

The bus interface 302 includes a clock in amplifier 438 that amplifies incoming signals received on the clock line 208. Additional pull-down resistors 440 and 442 may be associated with the clock line 208 to help provide a logical low when desired. Note that both, one, or neither of the pull-down resistors 440, 442 may be present.

Figure 5:
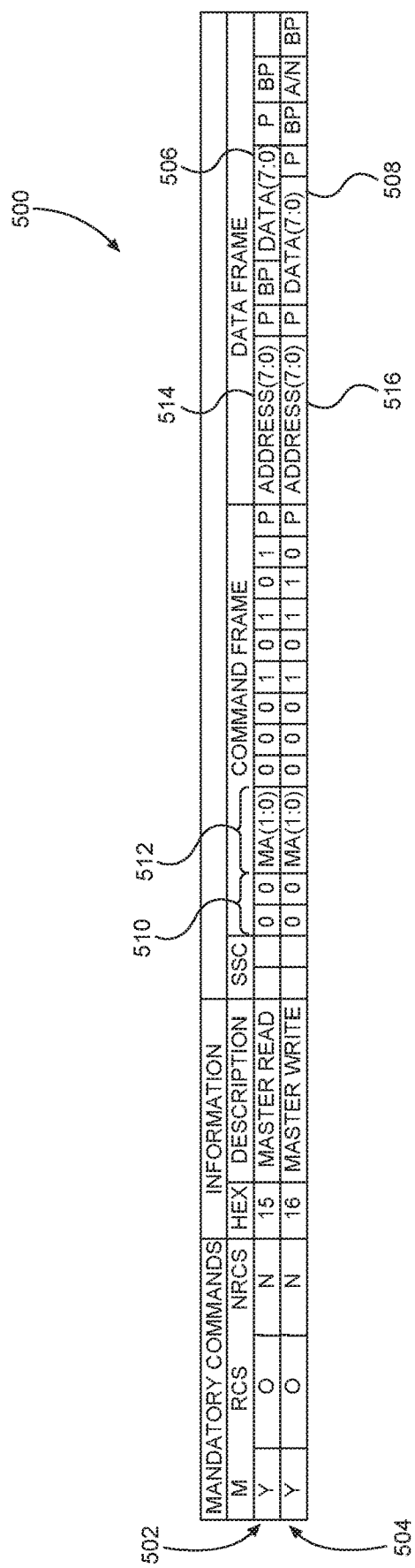
FIG. 5 is a table showing conventional master read and master write datagrams according to the SPMI protocol.
Figure 6:
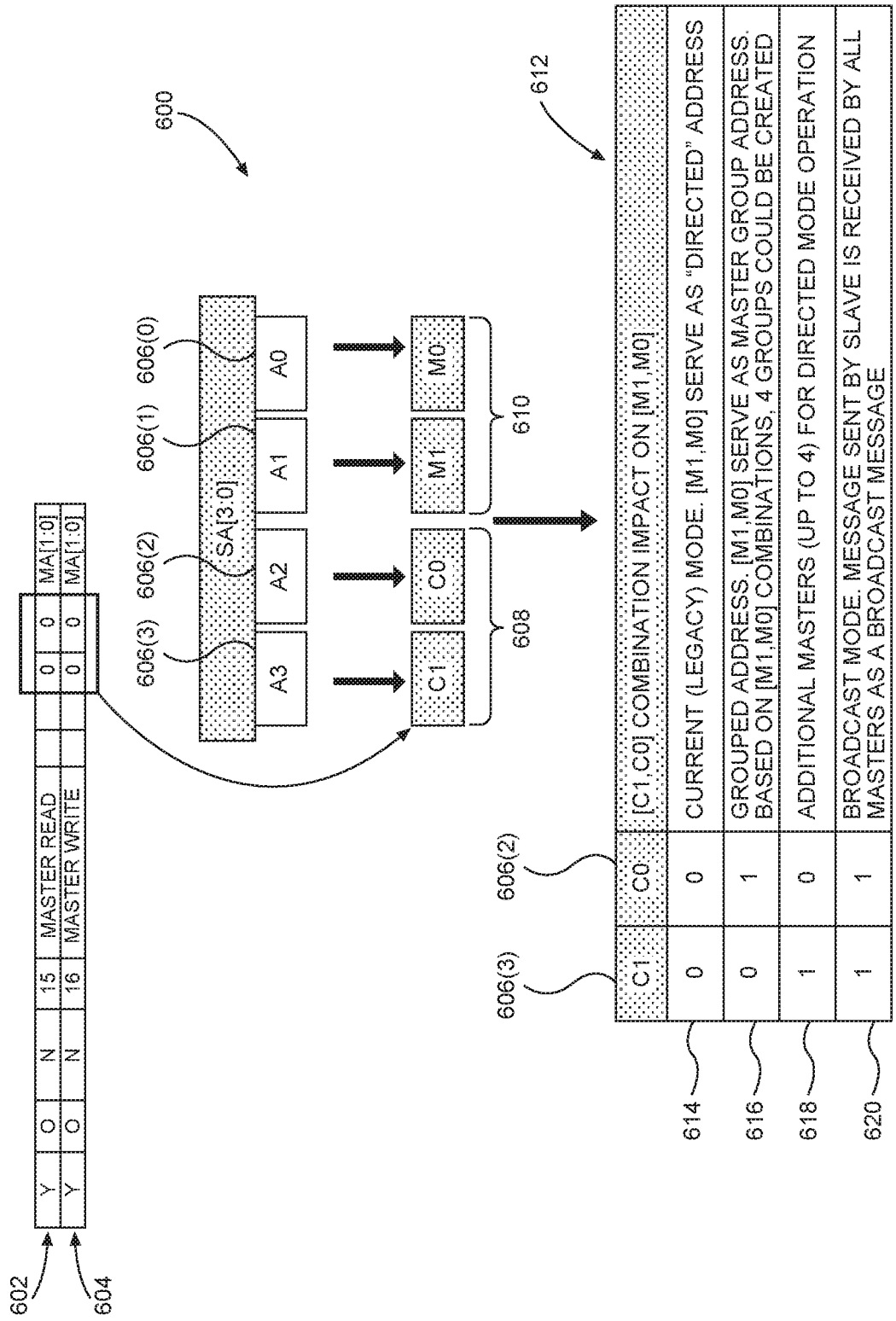
FIG. 6 illustrates bits of an SPMI datagram that are modified according to the present disclosure to provide expanded functionality as well as exemplary possible additional functions.

FIG. 5 illustrates, in table 500, a conventional master read datagram 502 and a conventional master write datagram 504, either of which can be sent by a slave (e.g., slave 206) to a master (e.g., master 204) to read from or write to registers 314. Of interest are a data field 506 in the master read datagram 502 and a data field 508 in the master write datagram 504. Per the SPMI standard, the data fields 506 and 508 are limited to one byte. When the SPMI standard was introduced, one byte was sufficient because slaves at that time did not generally read or write large amounts of data from or to the master. Rather, the master would read and write relatively large amounts of data from and to registers 330. However, emerging use cases now generate comparable amounts of data to be read from or written to the registers 314. Under the conventional SPMI protocol, large data transfers occurring in one byte may introduce undesired latency or otherwise negatively impact performance of a mobile terminal (e.g., mobile terminal 100 of FIG. 1). Exemplary aspects of the expanded function datagrams of the present disclosure allow for the data field to be expanded to up to sixteen (16) bytes, or equal to the volume of data that the master can read from or write to the registers 330. This increase in possible data transfers reduces or eliminates the latency and may otherwise improve performance of the SPMI subsystem 200.

The present disclosure provides for the expanded function datagrams by modifying bits 510 in the conventional datagrams 502, 504. In the conventional SPMI standard, these bits 510 are sometimes referred to as slave address (SA) bits and are set to 0,0 when a slave is sending a master read or a master write command, and bits 512 are used to address the masters 204(1)-204(4) (i.e., two bits can address up to four different masters) while address field 514, 516 identifies a specific register 314 to be accessed (either written to or read from).

As noted above, the current SPMI standard only allows up to four masters, but emerging uses, particularly in multi-core processors, may have more than four masters. Thus, a first expanded function for the datagrams of the present disclosure is to provide additional addressing options to accommodate more than four masters. To provide this expanded function, all the SA bits are used as better seen in FIG. 6. Specifically, table 600 illustrates part of a master read datagram 602 and part of a master write datagram 604. SA bits 606(0)-606(3) are divided conceptually into two sections 608 and 610. The first section 608 has SA bits 606(2) and 606(3) and is used to designate expanded functionality as explained in table 612. The table 612 explains how the SA bits 606(2) and 606(3) impact how SA bits 606(1) and 606(0) are interpreted. Specifically, line 614 shows that when bits 606(2) and 606(3) are set to 0,0 the elements in the SPMI subsystem 200 treat the master read or master write as a legacy command conforming to the conventional SPMI standard (e.g., only up to four masters can be addressed by bits 606(0) and 606(1) and only one byte of data may be read/written). Line 616 shows that when bits 606(2) and 606(3) are set to 1,0, a first group of up to four masters 204 may be addressed by bits 606(0) and 606(1) (e.g., two bits can be up to four addresses). Line 618 shows that when bits 606(2) and 606(3) are set to 0,1, a second group of up to four masters 204 may be addressed by bits 606(0) and 606(1). Finally, line 620 shows that when bits 606(2) and 606(3) are set to 1,1, a message sent by a slave 206 may be broadcast to all masters as a broadcast message.

It should be appreciated that the specific codes used are exemplary and variations could be made to achieve the same result. For example, 1,0 could be broadcast and 1,1 could be for the second group of masters. Further, instead of a broadcast to all masters, 1,1 could be for a third group of masters (which may be completely different than the first or second group of masters). Still further, 1,1 could be used to multicast or broadcast to a subset of all masters (e.g., 204(1), 204(3), 204(5), and 204(7)).

Figure 7:
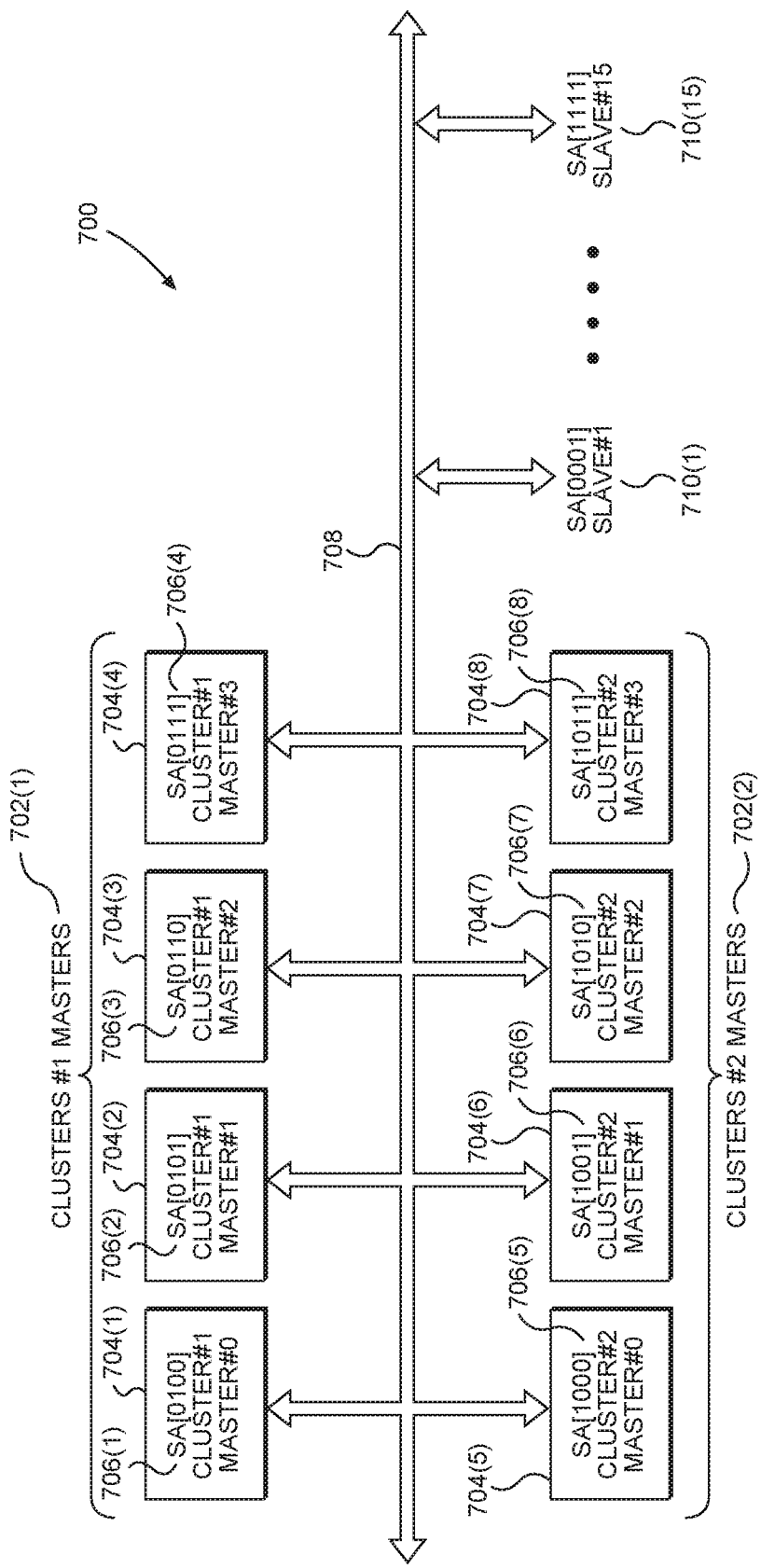
FIG. 7 is a block diagram of an SPMI subsystem having more than four masters made possible by the expanded functionality of the present disclosure.

By providing this expanded addressing function, a more robust SPMI subsystem may be provided having more than four masters. For example, as illustrated in FIG. 7, an SPMI subsystem 700 may include a first group 702(1) of masters 704(1)-704(4) having respective addresses (i.e., SA bits) 706(1)-706(4) and a second group 702(2) of masters 704(5)-704(8) having respective addresses (i.e., SA bits) 706(5)-706(8). An SPMI bus 708 couples the masters 704(1)-704(8) to slaves 710(1)-710(15).

In addition to adding the ability to address more masters within an SPMI subsystem, exemplary aspects of the present disclosure provide further enhanced function datagrams capable of transporting more than a single byte of data. Specifically, use of the enhanced addressing scheme also signals to the SPMI bus that the address and data frames within the datagram may be modified. In particular, what used to be the address frame under a conventional SPMI datagram is changed to a second command frame, which signals how what used to be the data frame is formatted. It should be appreciated that in the conventional SPMI standard, a slave read or a slave write command may have one of three possible formats. The three formats are one byte of register address and one byte of payload; one byte of register address and up to sixteen bytes of payload (e.g., extended register read/write); and two bytes of register address and up to eight bytes of payload (e.g., extended register read/write long).

Figure 8:
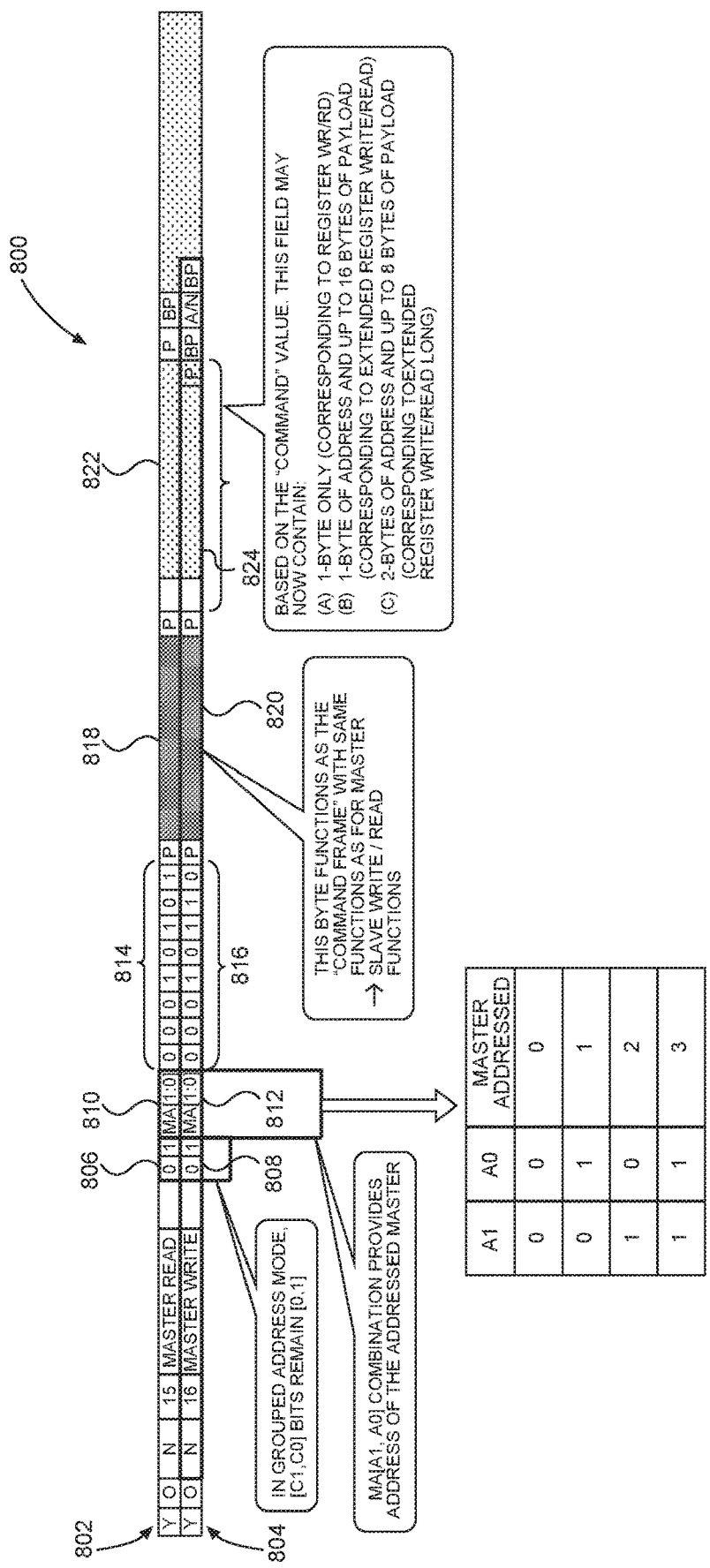
FIG. 8 illustrates expanded function master read and master write datagrams directed to a first group of masters according to exemplary aspects of the present disclosure.
Figure 9:
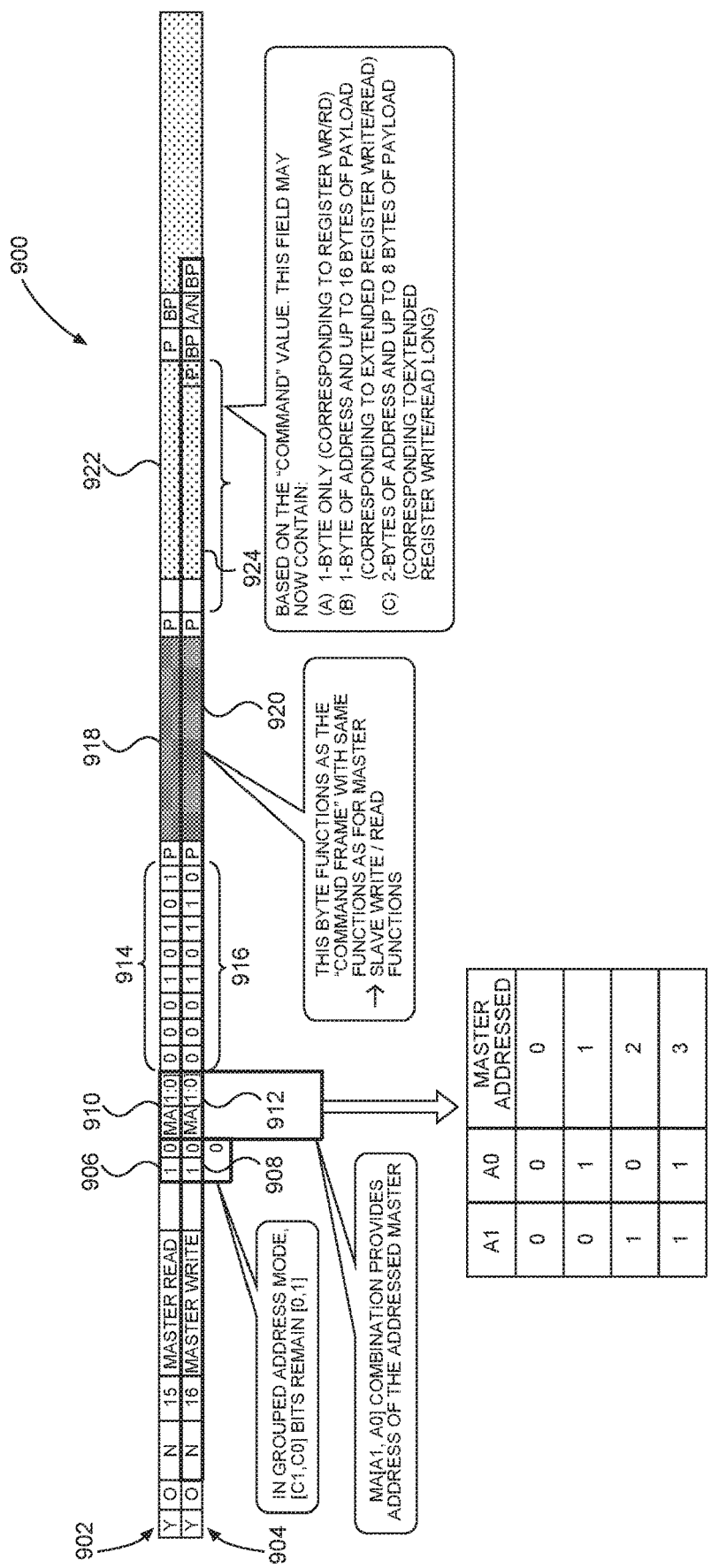
FIG. 9 illustrates expanded function master read and master write datagrams directed to a second group of masters according to exemplary aspects of the present disclosure.
Figure 10:
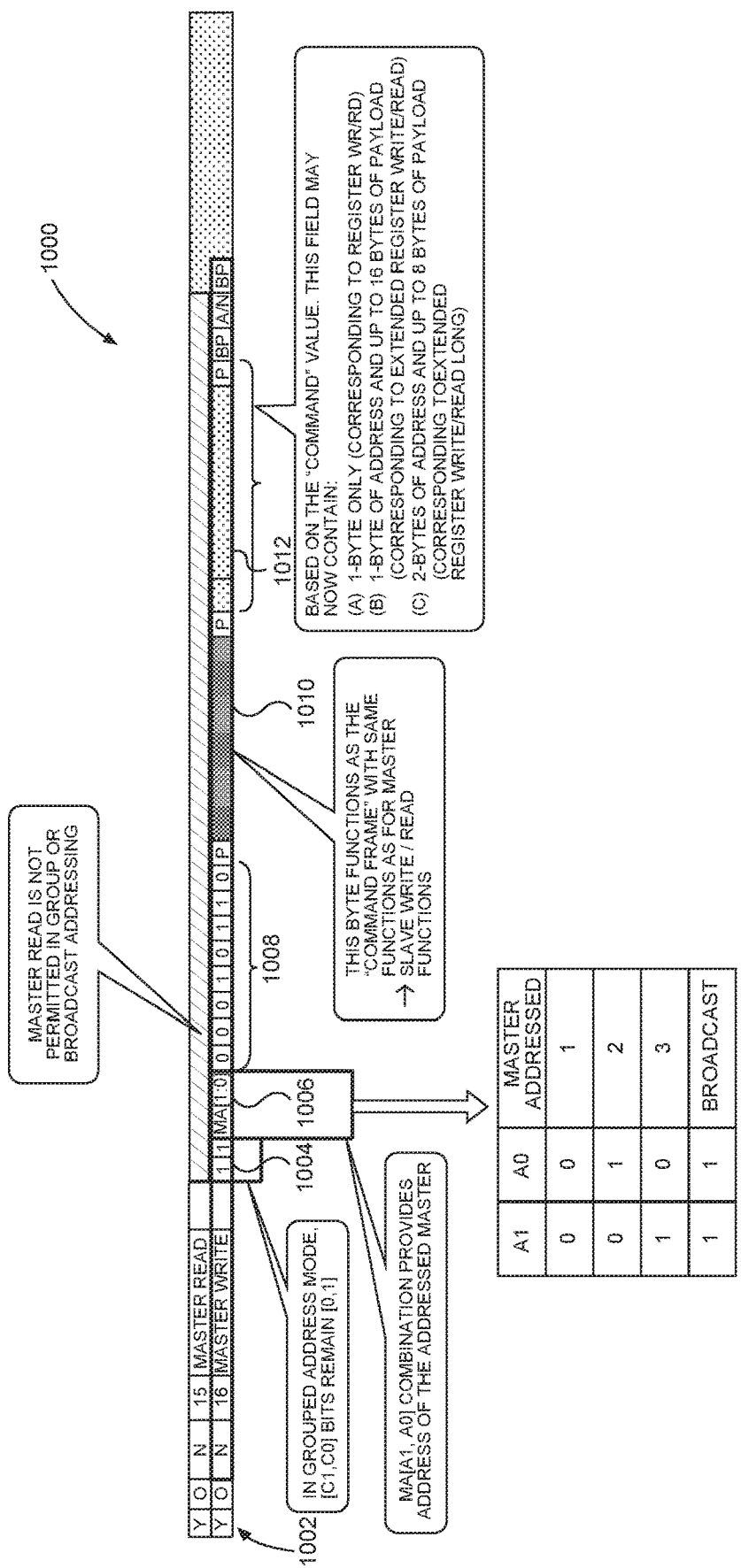
FIG. 10 illustrates an expanded function broadcast master write datagram directed to all masters according to exemplary aspects of the present disclosure.

To better assist in understanding the different address modes and how the address and data frames may be modified, FIGS. 8-10 show three exemplary datagrams. Datagram table 800 shown in FIG. 8 shows a master read datagram 802 and a master write datagram 804. The respective first SA bits 806 and 808 are set to 0,1 indicating that the first group of masters is being addressed. The second SA bits 810, 812 are used to indicate which of the four masters within the first group of masters is being addressed. The use of 0,1 (instead of 0,0) in the first SA bits 806, 808 also signals that the bits after other command frame bits 814, 816 are not an address frame (as would be true in a conventional SPMI datagram) but rather are used to form a second command frame 818, 820. In an exemplary aspect, the format of the second command frame 818, 820 is the same as the format for conventional slave read/write commands and is capable of one of the three possible formats. Thus, the bytes in frames 822, 824 are used to form a register address and a payload in one of the three formats.

Datagram table 900 shown in FIG. 9 shows a master read datagram 902 and a master write datagram 904. The respective first SA bits 906 and 908 are set to 1,0 indicating that the second group of masters is being addressed. The second SA bits 910, 912 are used to indicate which of the four masters within the second group of masters is being addressed. The use of 1,0 (instead of 0,0) in the first SA bits 906, 908 also signals that the bits after other command frame bits 914, 916 are not an address frame (as would be true in a conventional SPMI datagram) but rather are used to form a second command frame 918, 920. In an exemplary aspect, the format of the second command frame 918, 920 is the same as the format for conventional slave read/write commands and is capable of one of the three possible formats. Thus, the bytes in frames 922, 924 are used to form a register address and a payload in one of the three formats.

Datagram table 1000 shown in FIG. 10 shows a master write datagram 1002 for a broadcast command. Note that there is no broadcast master read command (shown by the heavy line) as the slave cannot listen to answers from multiple masters concurrently. The first SA bits 1004 are set to 1,1 indicating that this is a broadcast master write command directed to all the masters. The second SA bits 1006 are irrelevant since all masters are indicated by the broadcast command. The use of 1,1 (instead of 0,0) in the first SA bits 1004 also signals that the bits after other command frame bits 1008 are not an address frame (as would be true in a conventional SPMI datagram) but rather are used to form a second command frame 1010. In an exemplary aspect, the format of the second command frame 1010 is the same as the format for conventional slave read/write commands and is capable of one of the three possible formats. Thus, the bytes in frame 1012 are used to form a register address and a payload in one of the three formats.

Figure 11:
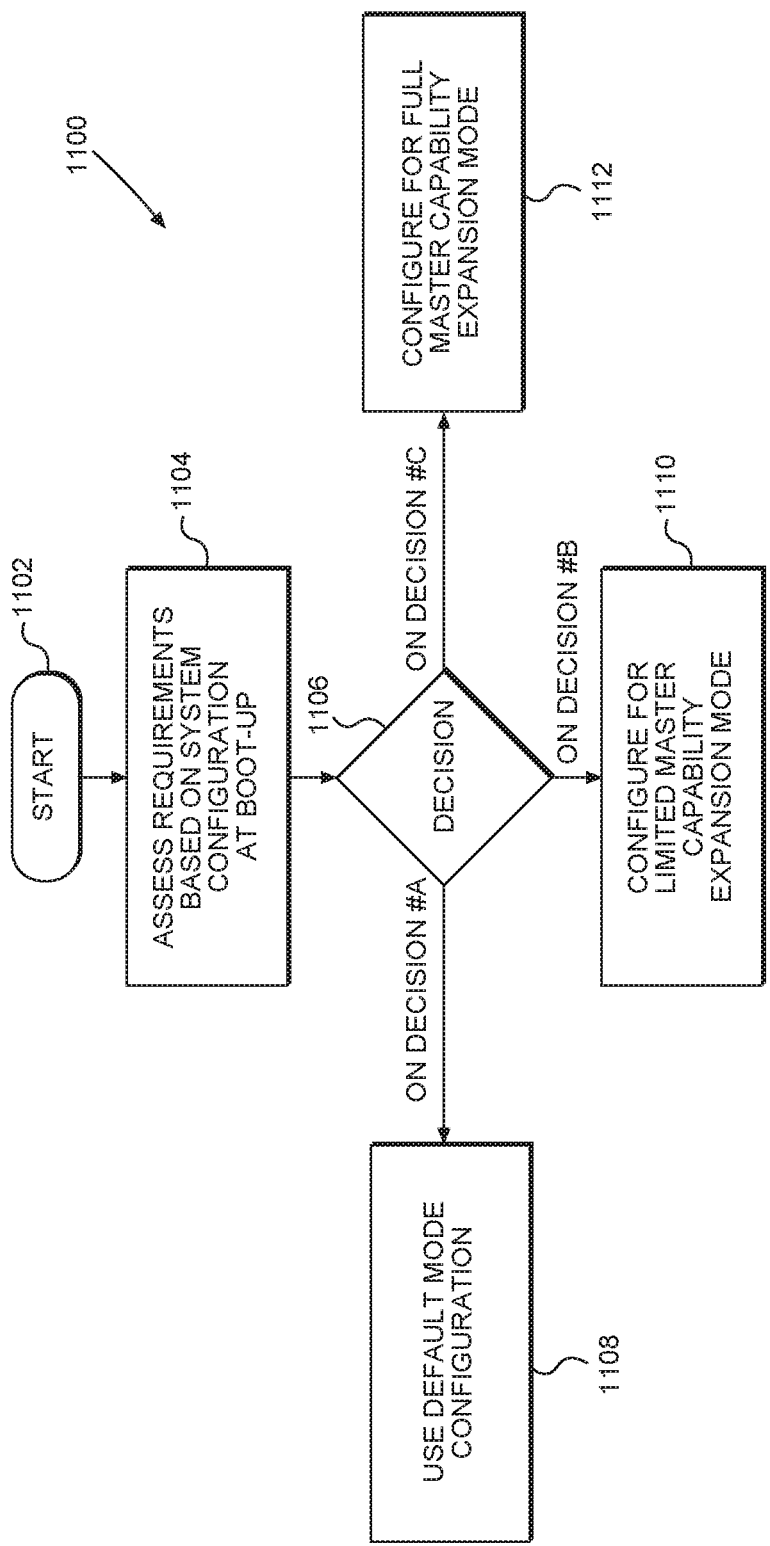
FIG. 11 is a flowchart for a decision process by a slave when determining what types of datagrams to use.

FIG. 11 provides a flowchart of a process 1100 undertaken at system boot-up where the SPMI subsystem determines an operation mode. Specifically, the process 1100 starts (block 1102) and assesses requirements based on system configuration at boot-up (block 1104). This assessment may include reference to capability registers, bus architecture (e.g., how many masters are on the bus), or other considerations. Based on the assessment, a primary master of the SPMI subsystem makes a decision (block 1106). If the requirements do not exceed conventional SPMI standards, then a default mode configuration is adopted (block 1108). If there is a requirement for moderate amounts of data, but there are no extra masters, then a limited expansion mode may be adopted (block 1110). More information about the limited expansion mode may be found in U.S. Pat. No. 10,642,778 entitled "SLAVE MASTER-WRITE/READ DATAGRAM PAYLOAD EXTENSION," which is hereby incorporated by reference in its entirety. If however, there are more than four masters or large payload requirements, a full master capability expansion mode is adopted (block 1112) consistent with the present disclosure.

The enhanced function datagrams in an SPMI subsystem according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Note that while the present disclosure discusses an SPMI subsystem as a particular environment that may benefit from the expanded function datagrams disclosed herein, the present disclosure is not so limited. Other power management subsystems benefit. Further, other subsystems that use two-wire buses such as an RFFE bus may benefit from the present disclosure.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC) comprising:
a bus interface coupled to a two-wire power management bus; and
a control circuit coupled to the bus interface, the control circuit configured to:
form a datagram comprising a command frame, the command frame comprising:
a first two bits indicating one of a first group of masters function, a second group of masters function, or a broadcast function;
a second two bits indicating a first address of a first master within a first group of masters or a second address of a second master within a second group of masters; and
a command structure.

2. The IC of claim 1, wherein the control circuit is further configured to determine that a read or write command to a master is needed and wherein the datagram operates as the read or write command.

3. The IC of claim 1, wherein the control circuit is further configured to determine the first address or the second address for a master.

4. The IC of claim 1, wherein the command structure is positioned at bits thirteen through twenty-one in the datagram.

5. The IC of claim 1, wherein the command structure includes an indication of an address format and a data format.

6. The IC of claim 1, wherein the control circuit is further configured to form a second datagram wherein a first two bits indicate a legacy function.

7. The IC of claim 1, wherein the bus interface comprises a system power management interface (SPMI) bus interface.

8. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. The IC of claim 5, wherein the address format may be a single byte or two bytes.

10. The IC of claim 5, wherein the data format may be a single byte, up to eight bytes, or up to sixteen bytes.

11. An integrated circuit (IC) comprising:
a bus interface coupled to a two-wire power management bus; and
a control circuit coupled to the bus interface, the control circuit configured to:
receive a datagram through the bus interface, wherein the datagram comprises:
a first two bits indicating one of a first group of masters function, a second group of masters function, or a broadcast function;
a second two bits indicating a first address of a first master within a first group of masters or a second address of a second master within a second group of masters; and
a command structure.

12. The IC of claim 11, wherein the datagram operates as a read or write command.

13. The IC of claim 11, further comprising a register and wherein the command structure includes a register address for the register.

14. The IC of claim 11, wherein the command structure is positioned at bits thirteen through twenty-one in the datagram.

15. The IC of claim 11, wherein the command structure includes an indication of an address format and a data format.

16. The IC of claim 11, wherein the IC comprises a master circuit.

17. The IC of claim 11, wherein the bus interface comprises a system power management interface (SPMI) bus interface.

18. The IC of claim 11 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

19. The IC of claim 15, wherein the address format may be a single byte or two bytes.

20. The IC of claim 15, wherein the data format may be a single byte, up to eight bytes, or up to sixteen bytes.

21. A power management subsystem comprising:
a two-wire power management bus;
a first integrated circuit (IC) comprising:
- a slave bus interface coupled to the two-wire power management bus; and
- a slave control circuit coupled to the slave bus interface, the slave control circuit configured to:
  form a datagram comprising a command frame, the command frame comprising:
  - a first two bits indicating one of a first group of masters function, a second group of masters function, or a broadcast function;
  - a second two bits indicating a first address of a first master within a first group of masters or a second address of a second master within a second group of masters; and
  - a command structure; and a second IC comprising:
- a master bus interface coupled to the two-wire power management bus; and
- a master control circuit coupled to the master bus interface, the master control circuit configured to:
  receive the datagram through the master bus interface.

* * * * *